United States Patent [19]

Funiciello

[11] 4,026,250
[45] May 31, 1977

[54] EXPLOSION INTERNAL-COMBUSTION ENGINES

[76] Inventor: Angelo Funiciello, Via San Sebastiano 33, Bergamo, Italy

[22] Filed: Nov. 15, 1974

[21] Appl. No.: 524,264

[30] Foreign Application Priority Data

Nov. 30, 1973 Italy .................................. 31969/73
June 19, 1974 Italy .................................. 24136/74

[52] U.S. Cl. .......................... 123/32 B; 123/191 SP; 123/193 CP
[51] Int. Cl.² ...................................... F02B 23/00
[58] Field of Search ............ 123/32 B, 32 C, 32 SP, 123/32 K, 32 L, 37, 191 SP, 193 CH, 193 CP, 193 P

[56] References Cited

UNITED STATES PATENTS

| | | | |
|---|---|---|---|
| 820,285 | 5/1906 | Cross | 123/37 |
| 2,041,940 | 5/1936 | Luker | 123/37 |
| 2,108,365 | 2/1938 | Buchi | 123/32 B |
| 2,121,813 | 6/1938 | Mitchell | 123/32 B |
| 2,136,416 | 11/1938 | Dehn | 123/193 P X |
| 2,360,943 | 10/1944 | Fischer | 123/32 B |
| 2,362,622 | 11/1944 | Fischer | 123/193 P X |
| 2,514,730 | 7/1950 | Sonderegger | 123/32 B |
| 2,766,739 | 10/1956 | Kosche | 123/32 B |
| 3,156,223 | 11/1964 | Blomquist | 123/32 B |
| 3,166,051 | 1/1965 | Hallberg | 123/32 B |
| 3,777,724 | 12/1973 | Kiley | 123/32 B X |
| 3,934,560 | 1/1976 | Dodd | 123/32 B |

*Primary Examiner*—C. J. Husar
*Assistant Examiner*—David D. Reynolds
*Attorney, Agent, or Firm*—Steinberg & Blake

[57] ABSTRACT

Improvements in or relating to explosion internal-combustion engines are disclosed, wherein a barrier is formed and divides the variable volume of the combustion chamber into two spaces or compartments communicating with each other for at least a fraction of the cooperation time between cooperating surfaces of the piston and the stationary portion of the variable volume chamber, these cooperating surfaces forming said barrier.

10 Claims, 6 Drawing Figures

EXPLOSION INTERNAL-COMBUSTION ENGINES

This invention is concerned with improvements in or relating to internal-combustion engines, also referred to as explosion engines. As proposed by the present invention, the improvements have the purpose of reducing the contaminating or polluting effect of explosion engines by substantially reducing the amount of unburnt materials, and allowing high degrees of filling because of the possibility of using wide sections in the openings for the inlet of the gaseous flows or streams and the outlet thereof from the variable volume chamber, wherein the motive fluid is effective. Particularly, even though this would not mean any limitation to the applicability of the inventive concepts to the general design of explosion engines (such as, some rotary engines such as, for example, Sorich type of orbital engines, and the like), the greatest advantages can be achieved by applying such concepts to fast powerful reciprocating explosion engines, such as those that have been disclosed in the Italian Patent Specifications No. 224,417; 725,459; 801,781 and 815,628.

In fast powerful explosion engines, it was found that some fraction or proportion of unburnt mixture passes from the induction duct to the exhaust duct during the crossing stroke at about the time where the minimum value occurs for the variable volume chamber, wherein the motive fluid is effective, at the completion of the exhaust stroke and at the beginning of the induction stroke, for the sake of brevity hereinafter referred to as "outer dead center." This fraction of unburnt products, which is so exhausted into the atmosphere, is a significant factor of pollution and reduces the engine efficiency and power, increasing the operating costs thereof.

It is one of the objects of the present invention to overcome the above mentioned disadvantages, to this end proposing that in proximity to and/or at the outer dead center, that is when the valves are at crossing stroke or phase condition, a barrier or resistance due to the coaction of the piston and cylinder head surfaces be interposed between at least one induction valve and one exhaust valve.

Moreover, in explosion engines, particularly engines having a large bore as compared with the stroke in order to provide very large valves, there are extended areas where the gases stagnate during the combustion stage and therefore do not burn.

It is another object of the present invention to overcome these disadvantages by avoiding the gas stagnation during the combustion stage, thus reducing the amount of unburnt products and allowing for very large valves, involving high rates of filling and hence high specific powers.

In order to remove this occurrence of gas stagnation, the present invention proposes that a partial barrier should be formed just before said outer dead center, this barrier comprising cooperating piston and head surfaces to divide the volume between the head and piston into two intercommunicating compartments; on one side of this barrier, preferably adjacent thereto, a combustion chamber is provided and located within one of said compartments, while the compartment on the other side of the barrier comprises a combustion zone; and additionally that ignition means are located close to or at said barrier.

Advantageously, such ignition means, being operated in advance with respect to the complete formation of the barrier, would trigger the combustion both in the combustion chamber and in the combustion zone, causing because of the smaller volume of the latter a stream of burnt and unburnt products which by going around or avoiding the barrier will move from said zone to the combustion chamber, where the combustion is completed and the required motive power acting upon the piston is produced.

In an advantageous embodiment, the barrier is interposed between an ignition means and a combustion chamber, while leaving at least one passage open, this passage being located so as to extend the path or travel of a rather significant amount of gas moving from said ignition means to said combustion chamber. In this embodiment, the combustion chamber and the ignition means (sparking plug) may be located at a mutual distance (as measured in plan) less than the cylinder diameter and, where valves are provided, at the same side of the latter, while the separating barrier is interposed between said ignition means and combustion chamber, so that the free distance therebetween is increased. By the term "free distance" as herein used, we mean that distance from the sparking plug to the combustion chamber when going around or avoiding the barrier, which is only a partial one.

The invention can be more clearly understood from the following detailed description of some embodiments thereof, as given by mere way of not limiting example and shown in the accompanying drawings in which.

Figure 1:
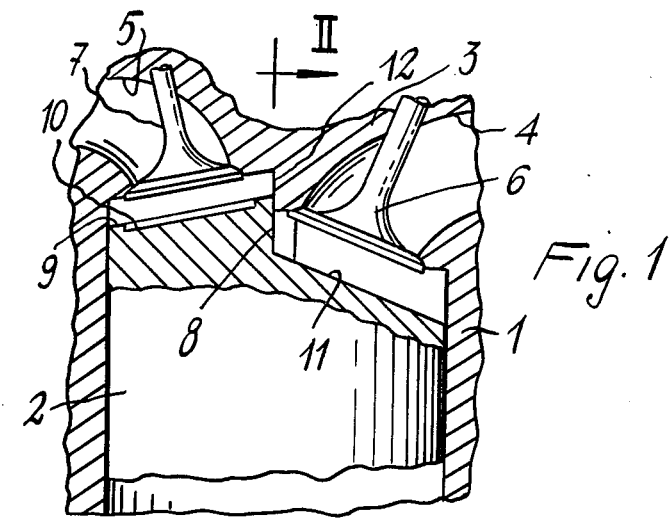
FIG. 1 is a diagrammatic vertical sectional view showing a two-valve engine at a position adjacent the outer dead center.
Figure 2:
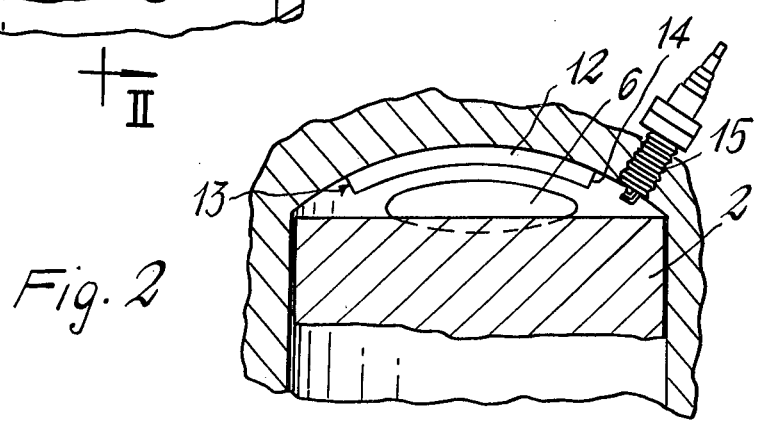
FIG. 2 is a diagrammatic sectional view taken along line II—II of FIG. 1.
Figure 3:
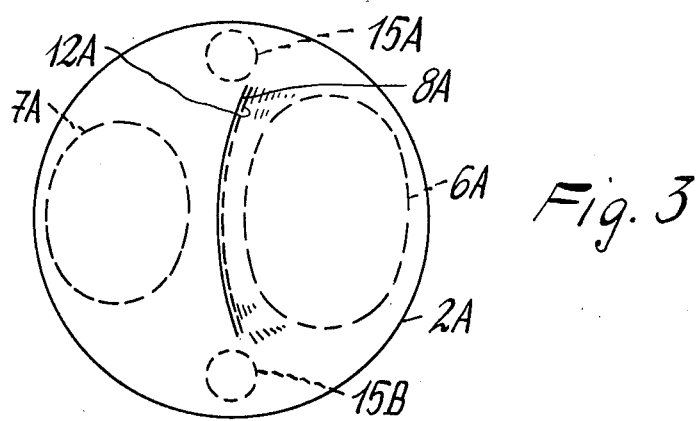
FIG. 3 is a diagrammatic plan view showing a modified embodiment of the piston, depicting by broken lines the positions for the valves, the two sparking plugs and the barrier forming surface pertaining to the head.

The improvements, to be described in the following, particularly the improvements as disclosed in FIGS. 1–3, are best applied to a fast powerful explosion engine, having a low valve lift at the outer dead center, valves of a large size, a main compact combustion chamber (to this end suitably selecting the stroke/bore ratio), an auxiliary combustion chamber (which may be smaller than the main combustion chamber), wherein burnt gases are generated and flush a "squish" zone and therefore drive the fresh gases therein into the larger main combustion chamber, where these fresh gases will burn. Engines exhibiting these features are known from the above cited patents.

Therefore, the combination of the teachings of said patents with the subject matter of the present invention is to be deemed as herein completed.

Referring to FIGS. 1 and 2, the engine comprises a cylinder 1 having a piston 2 sliding therein. In the head 3 provision is made for the conventional induction duct 4 and exhaust duct 5, which can be shut off by the poppet valves 6,7. At the top, the piston 2 has a preferably arcuate step 8 (as shown in a plan view), the height of which could become zero before the external contour of the piston, so that the step 8 has its maximum depth at the central region of the piston and is of a gradually diminishing depth toward the outer side wall of the piston while terminating short of the outer side wall. This step 8 defines two zones located at different heights on the upper face of the piston, but which zones can be interconnected at the ends, that is at the step sides. The highest zone, designated at 9, has a total or partial impression 10 for the exhaust valve 7, in order to accomodate the latter at the position of outer dead center. The lowermost zone, designated at 11, is in front of the induction valve 6.

Unlike the conventional heads, the head 3 has also a steplike configuration 12 of a complementary shape to that of step 8. As shown in FIG. 2, the head step 12 is not extended as far as the cylinder side wall, but stops at 13 or 14 at some distance therefrom to allow for positioning a sparking plug 15, and also because the shutoff of the unburnt mixture stream should occur where the distances between the valves 6 and 7 are the shortest.

Because of the stepwise configuration of the head, the exhaust valve 7 is offset relative to the induction valve 6; that is, the two valves are not symmetrically arranged relative to a vertical plane containing the piston axis.

When the piston 2 approaches the outer dead center, the two steps 8 and 12 begin to overlap other (see FIG. 1), that is to cover each other (the distance between the two steps being the possible shortest distance) and this covering increases on continued movement to the outer dead center.

When at the crossing stage both of the valves are open, a covering is provided between the two steps 8 and 12 and hence something as a gate, barrier or resistance is interposed along the paths of shortest distance between the valves, with a resulting high reduction in transfer of unburnt mixture from the induction side to the exhaust side.

The modified embodiment, diagrammatically shown in plan view in FIG. 3, differs from the preceding embodiment only because of providing to use two sparking plugs 15A and 15B, which are located at the end of the cooperating steps 8A and 12A, the latter being discontinued to this purpose at some distance from the outer side surface of piston 2A and arranged to extend the free travel between the valves 6A and 7A when the piston 2A reaches the proximity of said outer dead center.

Figure 4:
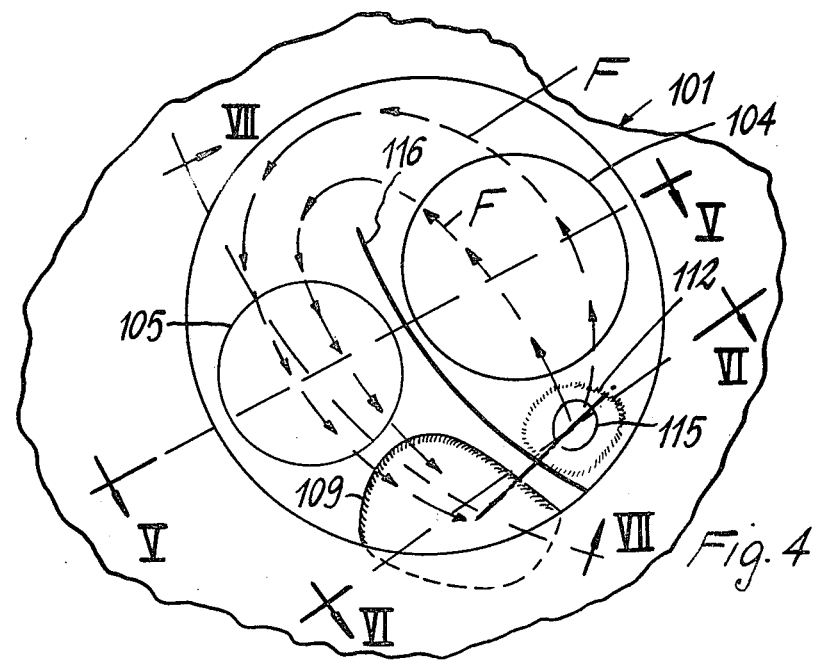
FIG. 4 is a bottom view of an engine head according to another embodiment, the view corresponding to the line IV—IV of FIG. 5.
Figure 5:
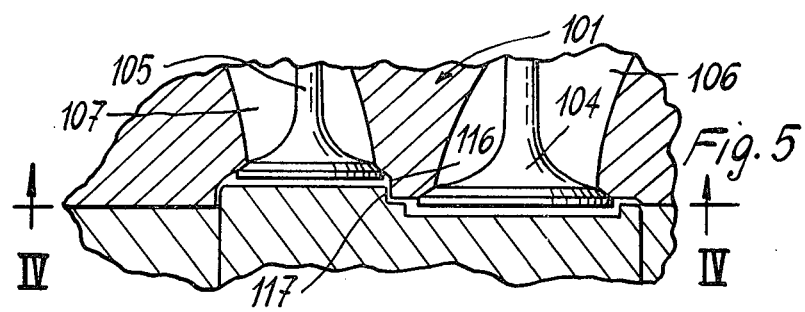
FIG. 5 is a sectional view taken along the line V—V of the head in FIG. 4, and showing the piston at the position of outer dead center, as well as the associated cylinder.
Figure 6:
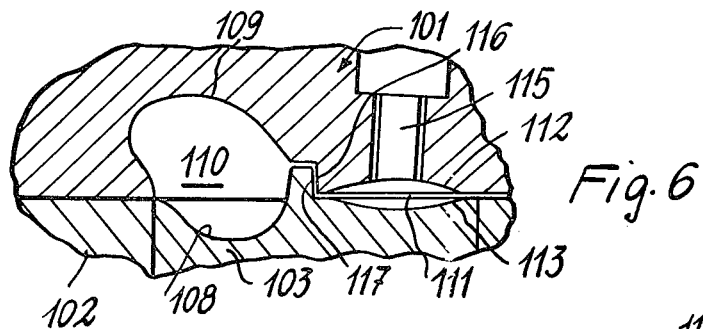
FIG. 6 is a sectional view of the engine at the outer dead center, this sectional view being taken along line VI—VI of FIG. 4.
Figure 7:
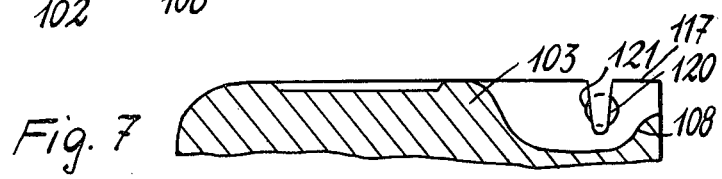
FIG. 7 is a sectional view taken along line VII—VII and showing the piston alone.

Referring to FIGS. 4–7, reference numeral 101 designates as a whole the engine cylinder head which has been shown in a bottom view in FIG. 4. It should now be specified that the section lines V—V and VI—VI of FIG. 4 are not limited to only the cylinder head 101, but are also related (see FIGS. 5 and 6) to the piston 103 and cylinder 102, while as to the curvilinear section VII—VII of FIG. 4, shown by broken lines, this section would correspond to a section on such a plane for only the piston 103 (see FIG. 7).

In addition to the above described members, the engine shown comprises an induction valve 104 and an exhaust valve 105, both of which of any conventional type, performing the function of controlling the opening of the induction and exhaust ducts 106 and 107, respectively.

At the top of piston 103 there is provided a recess having a side cavity 108 which at the top dead center position jointly with a cooperating recess 109 in the cylinder head 101 defines the combustion chamber 110, wherein the mixture concentrates and combustion is carried out. Adjacent this combustion chamber 110, there is provided a small chamber 111 (which could be eventually omitted without jeopardizing the validity of the invention). At one side this chamber 111 is defined by a substantially lenticular concavity 112 as provided in said cylinder head 101, and on the other side by a corresponding cavity 113 as provided at the top of piston 103.

As apparent, this small chamber 111 is formed only at the outer dead center of the piston.

In this small chamber 111 there are placed the electrodes (not shown) of a sparking plug (also not shown) which can be screwed down in a conventional threaded housing or seat 115.

In the engine cylinder head provision is made for a step 116 arcuately extending (see FIG. 4) and which somehow separates the concavity zone 109 of the combustion chamber 110 from the position of the sparking plug step 116, also extending between the induction and exhaust valves 104 and 105, respectively, as clearly shown in FIG. 4. Still before the piston reaches outer dead center, this step is cooperated with by a corresponding piston surface or step 117 to provide at the last part of the stroke for a barrier which in this case would substantially eliminate the direct connection, that is that connection which occurs on the shortest distance between the sparking plug and combustion chamber 110, building up therebetween a path which is of a by far longer length, as involving a straddling (in a plan view) of the barrier, the latter not extending throughout the cylinder head, as clearly shown in FIG. 4. In this figure, direct connection is shown by dash and dot lines, whereas indirect connection is that as specified by the arrows F.

The operation of this particular embodiment is as follows.

Prior to barrier forming (asuming that the piston is moving to the outer dead center during the compression stroke of a four-stroke engine) the spark is provided between the sparking plug electrodes (this meaning that a short spark advance or lead is given to ignition just as in conventional engines) and hence the gas portion close to the sparking plug is ignited. On continued direct connection (see dash and dot lines of FIG. 4) between the sparking plug and combustion chamber 110, also the combustion is triggered in the latter. Then, the above mentioned barrier is built up as formed by the cooperation of said steps or surfaces 116 and 117 with the result that the direct connection between the sparking plug and combustion chamber is shut off. Due to the higher pressure being built up below the sparking plug (because of the reduction in available space) a stream is provided of burnt or burning products moving from the sparking plug to the combustion chamber 110, going round or avoiding the barrier, thus following the path as specified by arrows F.

This stream or flow laps on the induction and exhaust valves, thereby removing the unburnt products which could otherwise remain at stagnation zones. In chamber 110 the combustion continues, producing the required motive force acting upon the piston which initiates its expansion stroke.

As it will be appreciated from the foregoing description, the partial barrier 116, 117 divides the volume between the cylinder head 101 and piston 103 into two intercommunicating spaces or compartments.

At one side of this barrier 116, 117 and adjacent thereto there is provided a combustion chamber 110 which is located within one of said spaces or compartments. The other space or compartment comprises a combustion zone which in this particular example comprises the above mentioned small chamber 111 (eventually this small chamber could also be omitted), this chamber and the sparking plug being located adjacent said barrier 116, 117.

According to a modified embodiment of the invention, provision can be made in the step 117 at the depression 108 for a notch 120 or a hole 121, leaving a direct communication between the zone of the sparking plug and combustion chamber 110 even when there is an initial superimposition of the cooperating surfaces 116, 117. This serves the purpose of extending for a suitable period of time the mixture priming through a certain point of the barrier even after the cooperation between the surfaces 116, 117 begins.

Of course, further modified embodiments are within the scope of the invention. For example, as to the surface 116 provided on the cylinder head, the location of the combustion chamber 110 and the zone of the sparking plug could be reversed with respect to those as shown in FIG. 4. This means that the zone of the sparking plug will be close to the exhaust valve 105, while the combustion chamber 110 will be close to the induction valve 104. In other modified embodiments, in addition to the sparking plug as provided in the approach shown in the drawings, further sparking plugs could be provided, as arranged at or adjacent to the combustion chamber 110 and/or along the path substantially indicated by the arrows F. In the embodiments shown in FIGS. 8, 9 and 10, use was made for the same reference numerals, but followed by letters A, B and C, respectively, to designate like or corresponding parts.

Figure 8:
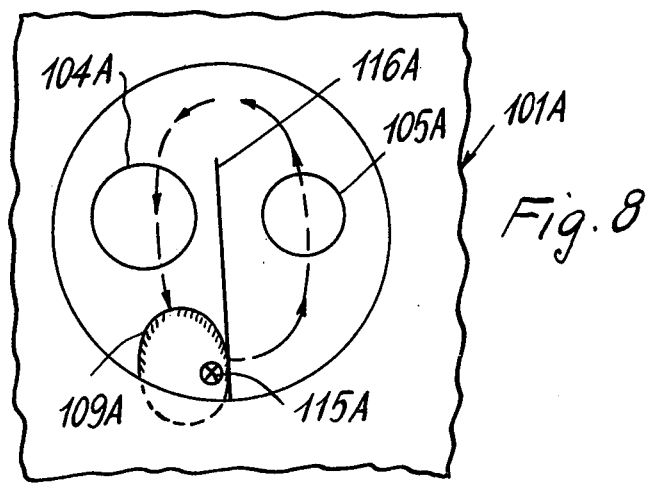
FIG. 8 is a diagrammatic view similar to that of FIG. 4, but showing the head according to a modified embodiment.

In FIG. 8, the sparking plug 115A is located within the recess 109A forming the combustion chamber and adjacent the step 116A (cooperating with the piston step, not shown, to build up the barrier). The ignition of the sparking plug, as advanced relative to the barrier generation, caused the combustion to be triggered or primed not only within the combustion chamber, but also within the combustion zone which will be at the opposite side of the barrier, building up the circulation of gaseous products as shown by the arrows.

Figure 9:
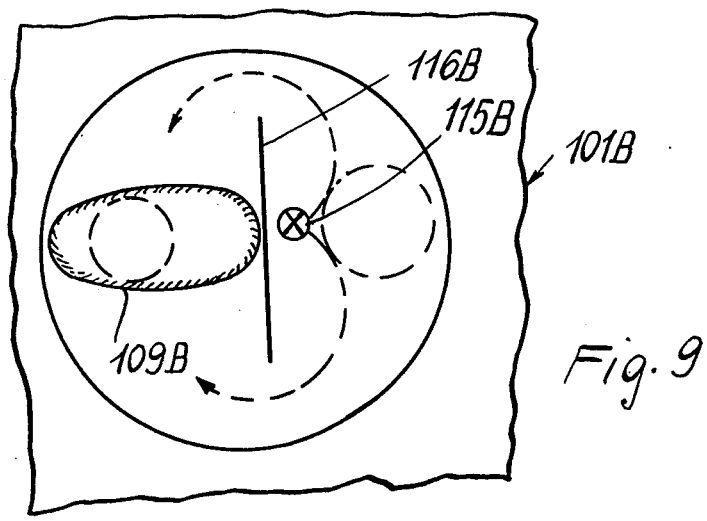
FIG. 9 is a view similar to that of FIG. 8, showing the head of a two-stroke engine as provided in accordance with the teachings of the present invention.

In FIG. 9, the barrier (comprising the step 116B and the corresponding piston step, not shown) will leave two passages at the ends. The sparking plug 115B is placed at one side, but close to the barrier, whereas the recess 109B (forming part of the combustion chamber) is placed at the other side, but not necessarily close to said barrier.

By dash lines the two valves are shown for a four-stroke engine. Of course, the two valves would be omitted in the case of a two-stroke engine.

Figure 10:
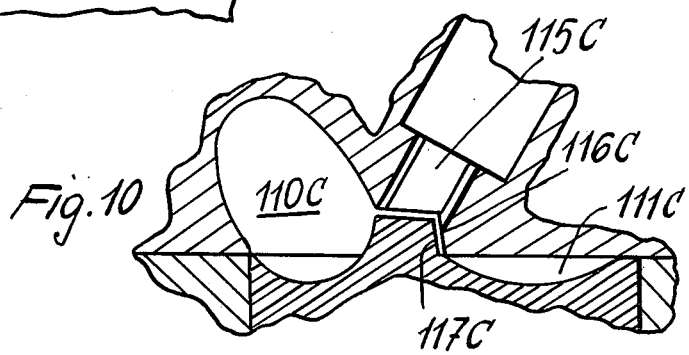
FIG. 10 is a view similar to that of FIG. 6, showing the modified embodiment wherein a sparking plug is located at the barrier.

Prior to barrier forming, by applying voltage to the sparking plug, combustion is initiated within the combustion chamber and the combustion zone close to the sparking plug. Therefore, the combustion products of this zone will move to the combustion chamber by going round or avoiding the barrier (see the arrows). In FIG. 10, the sparking plug 115C is located at the barrier 116C, 117C.

It is within the scope of the invention also the provision for at least another sparking plug located on the paths as designated on the several figures of the drawings by the arrows and/or within the combustion chamber.

In order to improve the barrier sealing properties, it could be provided that the surfaces of the barrier are made mechanically or chemically rough or porous and then coated and impregnated with a thin layer of soft material, such as antifire paint based on asbestos, carbon and the like. By the first operation, a roughness is obtained as shown by ridges and little gorges or depressions, while by the second operation (painting or contribution) the ridges are at least partly levelled. As a result of the unavoidable processing tolerances, it may occur that the two surfaces so processed would interfer each other during the engine operation. Therefore, it is provided to initially turn the driven engine with the valves being adjusted so as to be always slightly open (for example, 0.5 - 0.8 mm).

During this operation, the processed barrier faces could interfer, thus abrading and accomodating each other. The abraded particles are outwardly discharged, thus not adversely affecting the engine.

What I claim:
1. Improvements in or relating to explosion internal-combustion engines, comprising a cylinder having a cylinder head and a piston movable in said cylinder, having an axis in common therewith, and cooperating therewith to define a variable volume chamber, in which the motive fluid is effective, said cylinder head having an inner surface directed toward said piston and said piston having an end surface directed toward said cylinder head, and the latter surfaces respectively being formed each with a step extending transversely with respect to said axis and said steps overlapping each other as the variable volume chamber reaches its minimum volume, when the piston approaches an outer dead center position, said steps while extending across central portions of said piston and cylinder head surfaces being interrupted at least one end in the region of side surfaces of said piston and cylinder for defining a barrier dividing said volume into two spaces or compartments which are intercommunicating for at least a fraction of the time during which said steps overlap each other to lengthen the path of fluid flow from one to the other of said spaces or compartments by requiring the fluid to travel around the barrier, at least one induction valve and at least one exhaust valve respectively situated on opposite sides of the step of said cylinder head, thereby causing gases to have an extended path of travel in order to move from said induction valve to said exhaust valve.

2. Improvements as set forth in claim 1, wherein at least one ignition means is located at said cylinder head in line with said step thereof at the region where said step is interrupted.

3. Improvements as set forth in claim 1, wherein at one side of the barrier comprising the cooperating steps of the piston and cylinder head and dividing the volume between said cylinder head and piston into two intercommunicating spaces or compartments, perferably adjacent said barrier, provision is made for a combustion chamber located within one of said spaces or compartments, while that space or compartment at the other side of the barrier comprises a combustion zone, and wherein at least one ignition means is located in proximity to or at said barrier.

4. Improvements as set forth in claim 3, wherein said combustion chamber and ignition means are located at a distance which is less than the cylinder diameter and wherein the barrier is interposed between said ignition means and combustion chamber to increase the free distance therebetween, free distance being meant as the distance from the ignition means to the combustion chamber by going round said barrier.

5. Improvements as set forth in claim 3 wherein a further ignition means is provided and located at said combustion chamber.

6. Improvements as set forth in claim 3, wherein a passage is provided spaced from said axis in at least one of the steps which cooperate to form said barrier.

7. Improvements as set forth in claim 6, wherein said combustion chamber and ignition means are at the same side of said barrier.

8. Improvements as set forth in claim 6, wherein the ignition means is located at said barrier.

9. Improvements as set forth in claim 6, wherein said barrier provides for leaving the connections between said spaces or compartments free at its ends.

10. Improvements as set forth in claim 6, wherein said combustion chamber and ignition means are displaced to the cylinder periphery.

* * * * *